United States Patent [19]
Law

[11] Patent Number: 5,671,020
[45] Date of Patent: Sep. 23, 1997

[54] METHOD AND APPARATUS FOR IMPROVED VIDEO FILTER PROCESSING USING EFFICIENT PIXEL REGISTER AND DATA ORGANIZATION

[75] Inventor: Patrick Y. Law, Milpitas, Calif.

[73] Assignee: LSI Logic Corporation, Milpitas, Calif.

[21] Appl. No.: 542,283

[22] Filed: Oct. 12, 1995

[51] Int. Cl.⁶ .................. H04N 5/14; H04N 9/64
[52] U.S. Cl. .................. 348/608; 348/720; 348/642
[58] Field of Search ................ 348/720, 724, 348/608, 609, 642, 390, 303; H04N 5/14, 9/64

[56] References Cited

U.S. PATENT DOCUMENTS

| | | | |
|---|---|---|---|
| 5,210,705 | 5/1993 | Chauvel et al. | 348/720 |
| 5,216,506 | 6/1993 | Airoldi et al. | 348/720 |
| 5,247,355 | 9/1993 | Frederiksen | 358/105 |

Primary Examiner—Glenton B. Burgess
Attorney, Agent, or Firm—B. Noel Kivlin; Conley, Rose & Tayon

[57] ABSTRACT

A data register for providing data values to an n-element parallel processing array includes a memory buffer having first and second memory modules, where each module includes n columns of data values. An address decoder receives an address for accessing n data values at a time from the memory modules and asserts address values to access corresponding rows of the first and second memory modules. Select logic selects between respective columns of the first and second memory modules to retrieve the desired data values according to a predetermined order. A shift network reorders the retrieved data values, if necessary, to place them in the proper order for the processing array. The address decoder provides a select value to the select logic and a shift value to the shift network for each cycle. For purposes of horizontal decimation, the pixel values are organized into an even and an odd group, which groups are stored in the memory buffer in two separate regions separated by an address offset K. This data organization maximizes utilization of the processing array.

20 Claims, 10 Drawing Sheets

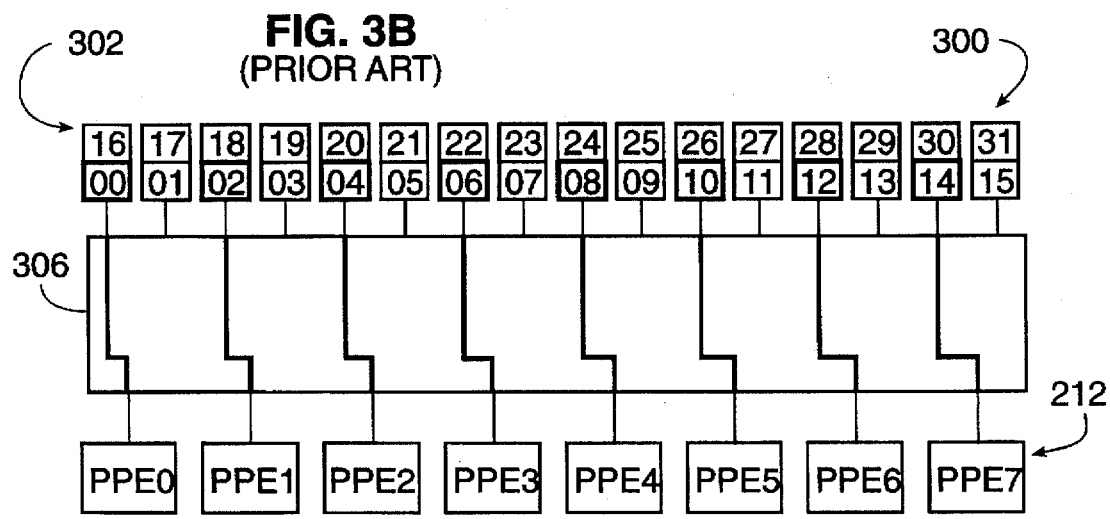
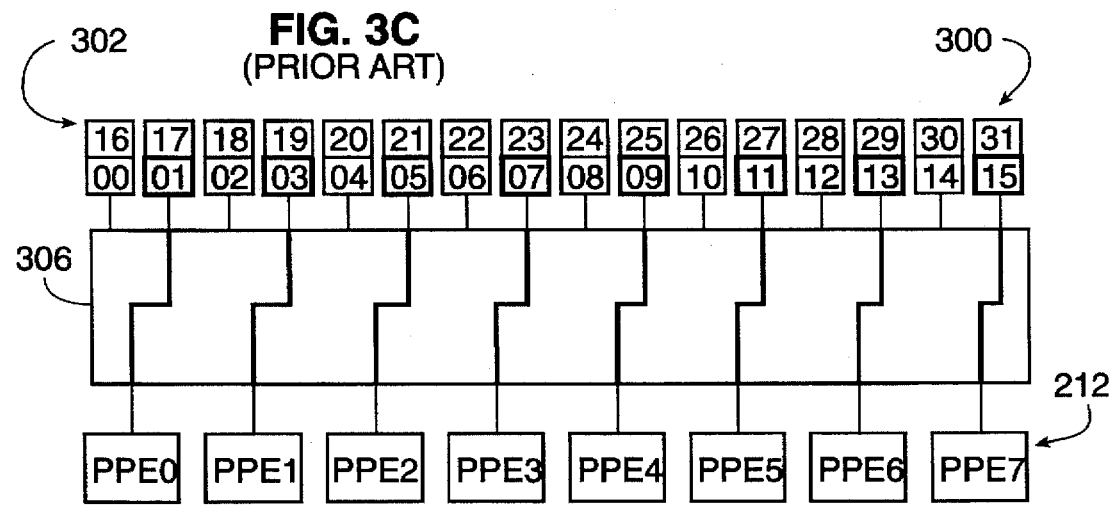
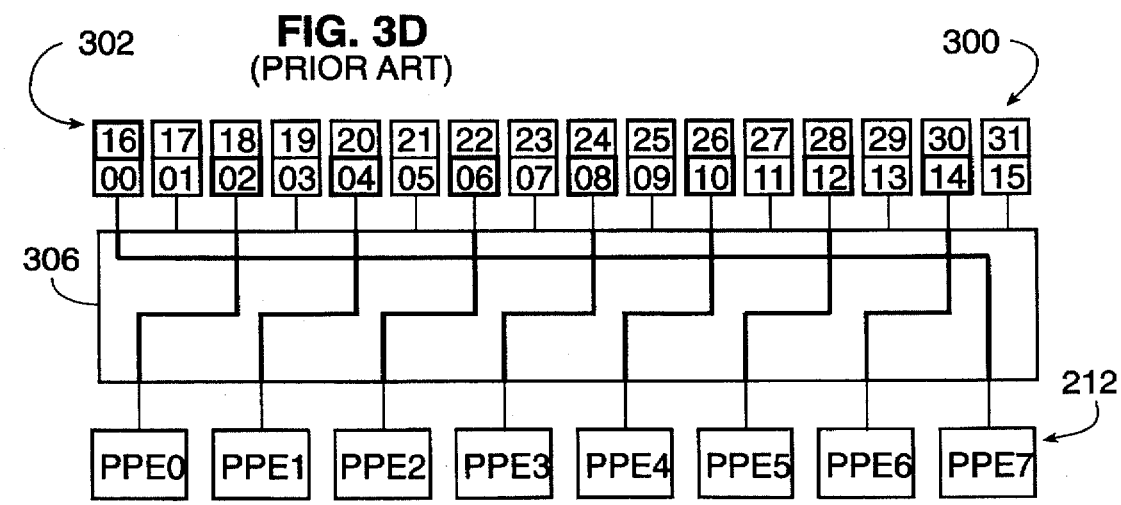

METHOD AND APPARATUS FOR IMPROVED VIDEO FILTER PROCESSING USING EFFICIENT PIXEL REGISTER AND DATA ORGANIZATION

SPECIFICATION

1. Field of the Invention

The present invention relates to video filtering operations, and more particularly to performing filtering operations using an efficient pixel register and data organization.

2. Description of the Related Art

Analog technology is quickly giving way to digital technology for storage and transmission of video information. This is primarily due to the increased interest in interactive multimedia and digital TV. Digital video information has many forms including static information, such as for a picture, or dynamic information, such as the case for moving pictures. Digital video information requires a relatively high data rate, so that it is often desirable or even necessary to compress the information for purposes of storage and/or transmission. One type of video compression system is that proposed by the Moving Pictures Expert Group (MPEG), a committee within the International Standards Organization (ISO). The first MPEG video standard, MPEG-1, is fully described in ISO-IEC JTC1/SC2/WG11, MPEG 90/176 Rev. 2, Dec. 18, 1990.

The first phase of the MPEG standard addressed the compression of video signals for digital storage media, like CD-ROM's at about 1.5 mega-bits per second (Mb/s). A second phase, referred to as MPEG-2, concerns high-quality coding of possibly interlaced video, including high definition television (HDTV). A wide range of applications, bit rates, resolutions, signal qualities and services are addressed, including all forms of digital storage media, TV broadcasting and communications. The MPEG system integrates several compression techniques, including motion-compensated predictive coding, discrete cosine transformation (DCT), adaptive quantization and variable-length coding (VLC). Prior to encoding the digital video data, however, it is often filtered or otherwise preprocessed since the data is more easily filtered before the encoding process is performed.

Video information is retrieved using a digital video camera or the like, where the information is sampled and converted to digital format. The data is typically in the form of 8-bit picture elements or "pixels", or simply "pels." Each pixel is preferably scaled to an 8-bit value for red, green and/or blue (RGB) components. The pixel values are then processed by a color matrix circuit or the like, which generates luminance (Y) values, which are weighted sums of the respective RGB components. The Y values are typically used in combination with difference signals or chroma values R-Y ($C_r$) and B-Y ($C_b$) to represent the picture. The pixel values are stored in raster scan format into a memory, such as a random access memory (RAM) or the like. The pixel values may further be processed by a video acquisition unit to extract the active portion of the pictures. The video data stored in the memory is often preprocessed prior to encoding according to MPEG-1, MPEG-2 or any other encoding scheme. Such preprocessing may include filtering functions, such as noise reduction, hierarchical decimation, chroma conversion, deinterlacing functions, etc., where the data is retrieved, processed and then stored back into the memory. The present invention concerns the preprocessing or filtering functions performed prior to encoding.

For real time video filtering operations, computational bandwidth on the order (O) of at least 500 million operations per second is required. To perform these functions, a vector processor or vector computer is used for video filtering operations since it provides relatively high performance for numerical operations. Such processors often used a SIMD (single-instruction stream multiple-data stream) architecture included a plurality of memory modules coupled to a plurality of parallel processing elements (PPEs). This architecture enabled relatively high bandwidth with parallel access and processing on predetermined subsets of the data, where corresponding streams of data subsets were simultaneously active and processed in parallel.

A video filter typically includes a pixel register for enabling horizontal, vertical, two-dimensional and temporal accesses of the pixel data. The present invention is illustrated for horizontal decimation functions, although vertical, temporal etc. decimation functions as well as other filtering functions, such as chroma separation, are also contemplated. Decimation of a picture requires changing the cutoff frequency to reflect a new, lower sampling rate. A low-pass filtering operation is preferably applied prior to the sub-sampling operation. To decimate a picture to half of its size horizontally, only half of the pixels need to be filtered. However, it is not trivial to perform horizontal decimation in a video filter using a conventional programmable processor array, since the hardware is not tailored to efficiently perform such single operation. Other requirements such as vertical, two-dimensional and temporal filtering may compromise the processor performance when performing horizontal decimation.

A conventional filter system included a pixel register which used a crossbar network to connect a memory buffer to an array of processing elements. The complexity of the crossbar network is typically on the order of at least $n^2$ ($O(n^2)$) for the connection of the processor array and the memory buffer. In particular, the crossbar was proportional to the number of crosspoint switches, which number grew as $n^2$, where n is the number of processing elements. The memory buffer included a plurality of memory modules, each with its own address generator, power grid, routing, etc., which added to the cost and overhead of the system.

The resulting conventional design was relatively expensive and consumed a large amount of power, where both the cost and power consumption increased with increasing order or size of the crossbar network. Each switch in the crossbar switching matrix included at least one complementary metal-oxide semiconductor (CMOS) transistor or the like, which further included a significant amount of capacitance. The constant charging and discharging of the switches during operation consumed an appreciable amount of power. Also, as n increased, the size of the matrix grows prohibitively large and consumed valuable space, which tended to increase the cost of implementation. Furthermore, each memory module required a significant amount of overhead, such as a plurality of separate address generators, power grids for the RAM, substantial amount of routing conductors, etc.

It is desired to perform video filtering operations, including horizontal decimation, without the prohibitive cost and power consumption of the standard crossbar network.

SUMMARY OF THE INVENTION

A data register according to the present invention for providing data values to a parallel processing array comprises a memory buffer including first and second memory modules. An address decoder receives an address for accessing a set of data values from the dual memory modules and asserts address values to access corresponding rows of the first and second memory modules. Select logic selects between respective columns of the first and second memory modules to retrieve the desired data values according to a predetermined order. A shift network reorders the data values retrieved from the memory buffer into the correct order, if necessary, and provides the retrieved data values to the processing array. The address decoder decodes the address to provide a select value to the select logic and a shift value to the shift network. A data register according to the present invention is particularly advantageous for video applications requiting a fast data path, where the data values are pixels.

For purposes of decimation and other video filtering operations, a plurality of consecutive pixel values are separated into odd and even pixels. Even pixels are stored in an even region beginning in a first column indicated by an initial index in one of the dual memory modules, and odd pixels are stored in a region starting in the other memory module beginning at an offset (K) from the initial index. The offset K is enough to displace the odd pixel region beyond the even pixel region and to begin in a first column of the other memory module. This data organization maximizes processor utilization since the main processor does not sit idle during any cycles while performing video processing functions. Prior art designs required more memory modules and corresponding ports to achieve the same functionality. Although the number of memory modules and ports could have been reduced in prior designs, the processing array would be idle during certain cycles thereby substantially decreasing processor utilization.

In a first memory access cycle, the pixel register retrieves a group of even pixels from one module and provides them to the processing array for multiplication with a coefficient value. In the next cycle, the pixel register retrieves an associated group of odd pixels from the other module and provides them to the processing array for multiplication with a coefficient value and for adding each result to the corresponding result from the first cycle. In a third cycle, the pixel register retrieves the next group of even pixels and provides them to the processing array for the final multiply and add step. Assuming eight processing elements, these three cycles process twenty-four input pixels and provide eight output pixels. The process is repeated until all desired pixels have been decimated in similar fashion.

In the preferred embodiment, the select logic comprises an array of n multiplexers (muxes), each for selecting between corresponding columns for the first and second memory modules. Each memory module is preferably 8 pixels wide, where each pixel is 8 bits, for a total of 64 bits. The array of muxes are preferably 2:1, 8-bit muxes, although any convenient size may be used depending upon the specific application. Several implementations are possible for the shift network. In the preferred embodiment, the shift network is a right shift network comprising a plurality of muxes. In one embodiment, a plurality of stages of 2:1 muxes enable shifting of one, two and four shifts, respectively, to enable a right shift from anywhere between 0 and 7 shifts. In an alternative embodiment, the shift network comprises a shift network including 8×8:1 muxes, each receiving a three-bit address indicating the number of shifts desired. In this manner, the pixels are retrieved from the memory banks and reordered in a relatively efficient manner.

A particular advantage of the present invention is that only two memory banks need be used, rather than 2n or more memory banks typically used for a crossbar network. Each memory module implemented according to prior art typically required an address generator, thus representing a significant amount of overhead since a plurality of such modules were required. In a pixel register according to the present invention, only two memory modules are needed, and a single address generator provides the necessary address values, provides the select values to the select logic and also provides the shift values to the shift logic. The address value provided to select rows of the second module is a conditional increment of the address value provided to the first module, thereby simplifying the logic of the address generator. This substantially simplifies the hardware and considerably reduces the amount of overhead associated with the memory modules. This is true even for performing operations such as horizontal decimation or chroma separation, since the pixels are easily reorganized into two groups of even and odd pixels.

In this manner, a method and apparatus according to the present invention for performing video decimation operations using an efficient pixel register and improved data organization provides all the benefits and advantages of conventional designs and methodology without the excessive cost, size and power consumption.

BRIEF DESCRIPTION OF THE DRAWINGS

A better understanding of the present invention can be obtained when the following detailed description of the preferred embodiment is considered in conjunction with the following drawings, in which:

FIGS. 3B–3D are a series of snapshot diagrams illustrating a horizontal decimation operation using the pixel register of FIG. 3A;

DETAILED DESCRIPTION OF THE PREFERRED EMBODIMENT

Figure 1:
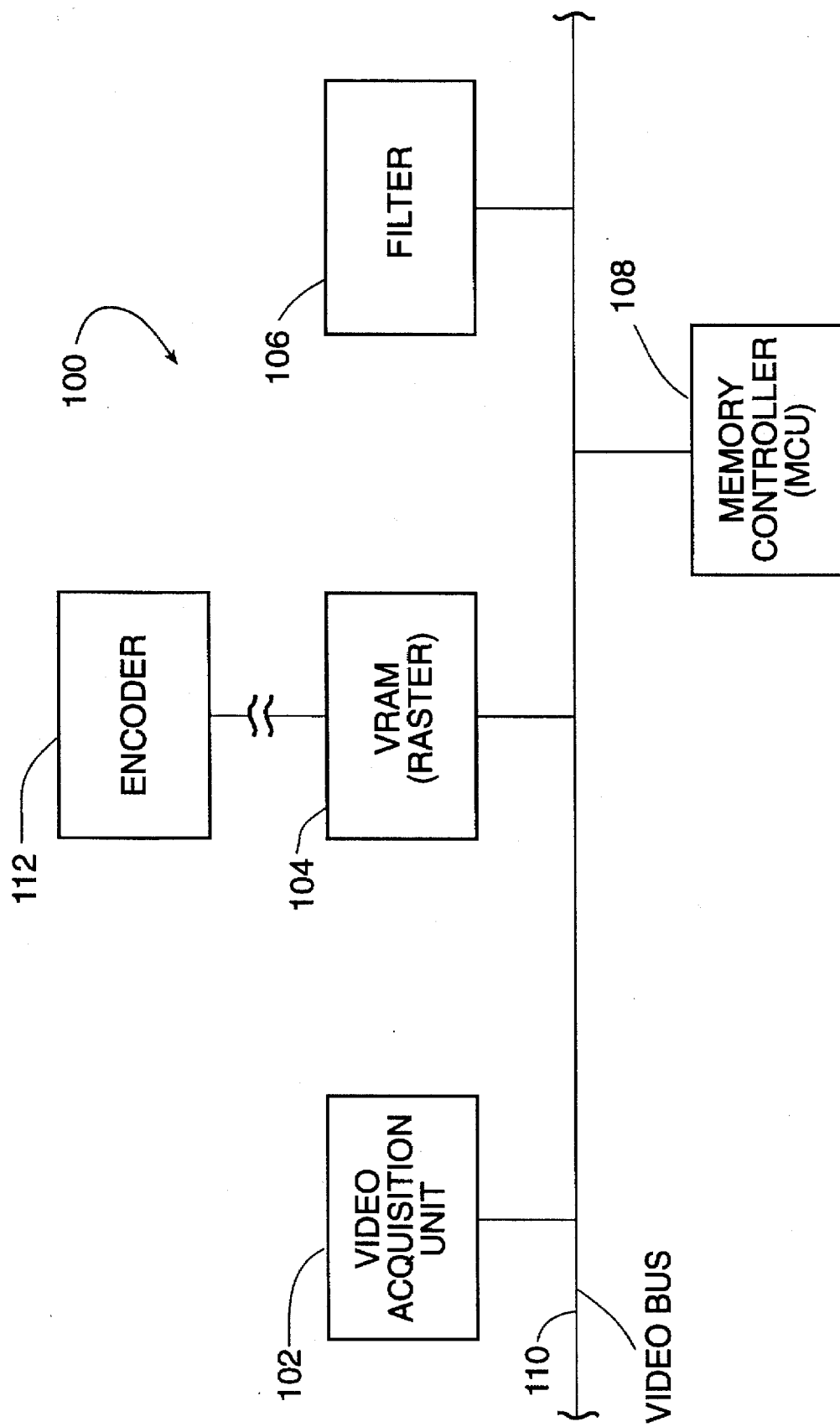
FIG. 1 is a block diagram illustrating a video system according to the present invention.

Referring now to FIG. 1, a simplified block diagram illustrates a video system 100 according to the present invention. Video data is detected and sampled using a digital video camera (not illustrated) or the like for providing digital values. The digital values may have one of many forms, but are usually represented in the form of red, green and blue (RGB) pixel values scaled to 8 bits representing values between 0 and 255. The pixel values are usually converted into luminance values (Y), which are a weighted sum of the respective RGB values, and into corresponding chrominance values R-Y or $C_r$ and B-Y or $C_b$. This conversion is performed using a conventional color matrix or the like, where the data remains scaled to 8-bit pixel values. The pixel values are then provided to a video acquisition unit 102 for extracting the active portion of the picture or pictures. It is noted that the present invention is not limited to any particular format of pixel data.

The video acquisition unit 102 is preferably coupled to a video bus 110 for transferring the pixel values to a video random access memory (VRAM) 104, where the pixel values are preferably stored in raster scan format. A programmable filter 106 is also coupled to the video bus 110 for preprocessing the pixel values stored in the VRAM 104 prior to encoding by an encoder 112. The programmable filter 106 retrieves the data from the VRAM 104 and performs any one of several programmable functions according to the particular application for the video system 100. For example, preprocessing filtering operations may include noise reduction, hierarchical decimation, chroma conversion (e.g. 4:2:2 to 4:2:0), deinterlacing, pull-down detection for detecting repetitive fields, etc. The processed pixel values are preferably stored back into the VRAM 104 after being processed. Data transfer between the video acquisition unit 102, the VRAM 104 and the filter 106 is preferably controlled by a memory controller (MCU) 108 which is also coupled to the video bus 110. The VRAM 104 is preferably dual port memory including another port for transferring processed pixel values to the encoder 112 for purposes of encoding the data for storage and/or transmission. The encoding process is preferably according to the MPEG-1 or the MPEG-2 standards, although the MPEG standards are for example only since any particular encoding scheme is contemplated.

Figure 2:
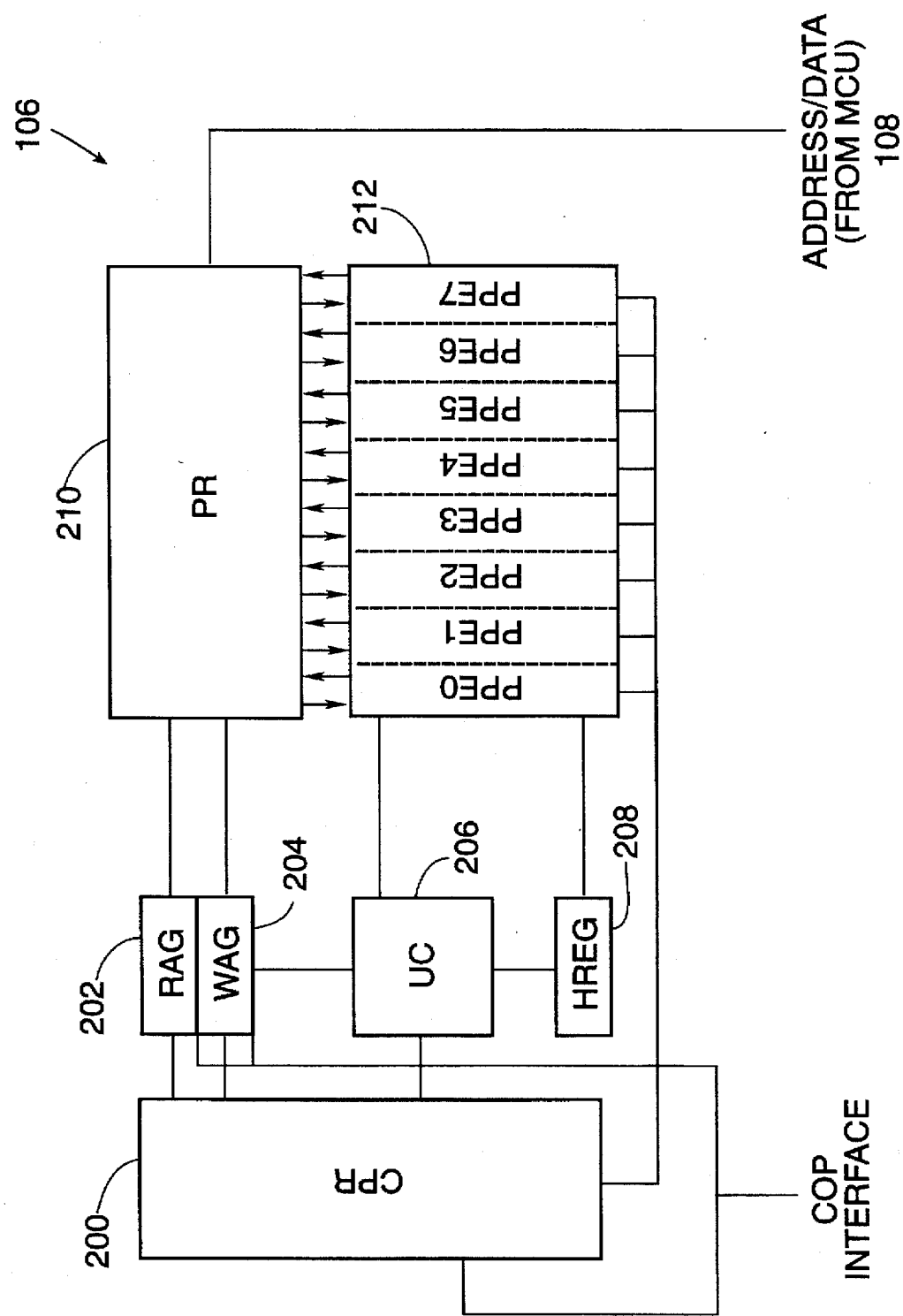
FIG. 2 is a block diagram of the programmable filter of FIG. 1.

Referring now to FIG. 2, a more detailed block diagram is illustrated of the programmable filter 106. The programmable filter 106 includes a coprocessor register file (CPR) 200, which is the primary interface to a host central processing unit (CPU) (not illustrated). The CPR 200 is further connected to a read address generator (RAG) 202, a write address generator (WAG) 204 and a microcontroller (UC) 206. The microcontroller 206 is further connected to a coefficient register file (HREG) 208 for storing coefficient values used in video filtering operations. The RAG 202 and WAG 204 are also connected to a pixel register (PR) 210, which receives addresses and data from the MCU 108. The pixel register 210 is further coupled to an array of parallel processing elements (PPE) 212, preferably including eight elements PPE0–PPE7. In the preferred embodiment, pixels are processed eight at a time although the filter 106 may be generalized to process any number of pixels at a time depending upon the particular application. Eight pixel processing is relevant to the memory bus structure implemented in the design which fetches/stores pixels in groups of eight pixels at a time.

The RAG 202 generates read addresses to the pixel register 210 for loading data into the processing array 212. The WAG 204 generates write addresses to the pixel register 210 for storing results from the processing array 212. Each of the address generators RAG 202 and WAG 204 are programmable to produce addresses for reading or writing multiple blocks of pixels. The microcontroller 206 retrieves instructions through the coprocessor interface from the host CPU. The microcontroller 206 then steps through a dispatch routine preferably stored in a micro-instruction memory within the microcontroller 206. Control signals are then generated by the microcontroller 206 for controlling the operation of the programmable filter 106. As described more fully below, the programmable filter 106 utilizes a single-instruction stream, multi-data stream (SIMD) data path, where a single instruction received by the microcontroller 206 is used to process data within the pixel register 210 using the processing array 212. The HREG 208 preferably includes sixteen 10-bit broadcasting coefficients provided to the processing array 212.

The processing elements PPE0–PPE7 of the processing array 212 preferably operate in a lock-step manner with each other in response to instructions received and executed by the microcontroller 206. Each processing element receives its own input data stream from the pixel register 210. After the required computation is performed by the respective processing elements PPE0–PPE7, the results are written back into the pixel register 210. In the preferred embodiment, each one of the processing elements PPE0–PPE7 consists of a multiplier, an arithmetic logic unit (ALU), a shifter, a register file, round and clip circuitry and some control logic. Pipeline stages are preferably inserted into the data path in order to fit a particular critical cycle time.

The pixel register 210 is preferably a vector memory used for storing and retrieving a pixel array. It preferably functions as a buffer between the fast SIMD data path and the external VRAM 104, which is relatively slow. The pixel register 210 generally includes a memory buffer for storing pixel values and a connection network for providing the pixel values to, and for retrieving the processed pixel values from, the processing array 212. For real time video filtering operations, computational speed of at least 500 million operations per second is required to achieve the desired bandwidth. Thus, the interface between the pixel register 210 and the processing array 212 must operate in an extremely fast manner.

Figure 3A:
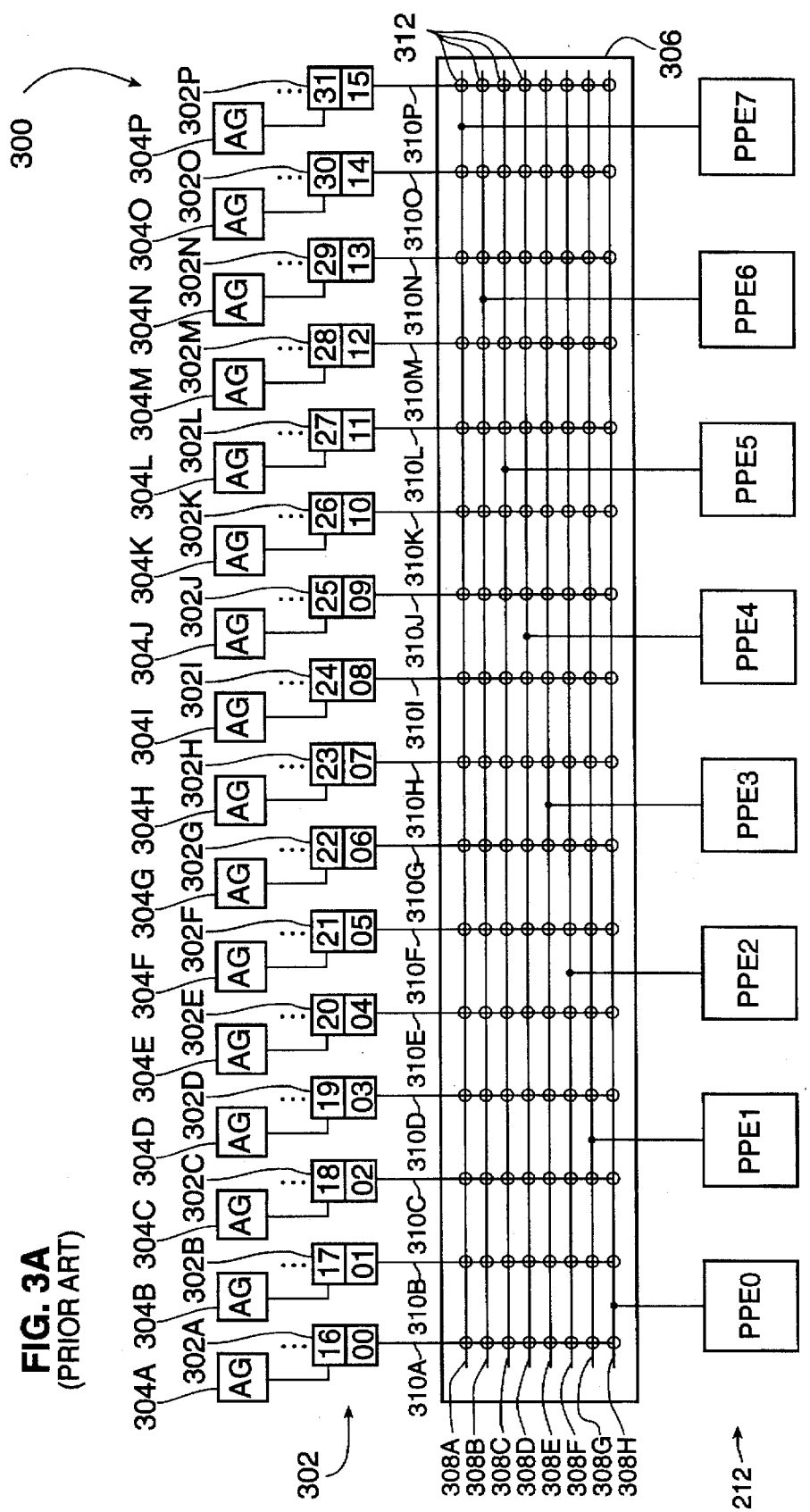
FIG. 3A is a simplified block diagram illustrating a pixel register implementation using a plurality of memory modules and a crossbar network according to prior art.

FIG. 3A is a simplified block diagram of a pixel register 300 implemented according to prior art as connected to the processing elements PPE0–PPE7. A memory buffer 302 includes a plurality of n-bit memory modules 302a–302p. In this particular example, each pixel value is 8 bits, and there are twice as many memory modules as processing elements. As will be described further below, there are twice as many memory modules to achieve horizontal decimation and similar type video filtering functions. Each memory module 302a–p is controlled by a separate address generator (AG) 304a–p, respectively, for accessing individual pixels within each of the respective modules 302a–p. The address generators 304a–p determine which pixel within each of the memory modules 302a–p are accessed at any given time.

To enable connection for each of the address modules 302a–p to each of the processing elements PPE0–PPE7, respectively, a crossbar network 306 is included. The crossbar network 306 has a corresponding size of "n" equaling the number of memory modules and "m" equaling the number of processing elements, where in the embodiment illustrated, n=16 and m=8. Each of the processing elements PPE0–PPE7 is preferably connected to a corresponding bus signal 308a–h, respectively, within the crossbar network 306, and each of the memory modules 302a–p includes a corresponding bus signal 310a–p, respectively, for potential connection to any one of the bus signals 308a–h. 128 switches 312 are provided within the crossbar network 306 for potentially coupling each of the bus signals 308a–h to corresponding ones of the bus signals 310a–p, for connecting any one of the memory modules 302a–p to a corresponding one of the processing elements PPE0–PPE7. In particular, each memory module 302a–p and its associated bus signal 310a–p are associated with eight switches for coupling to any one of the bus signals 308a–h at a time. Thus, only one of the eight switches associated with each memory module 302a–p is activated at a time for connecting that memory module to a corresponding one of the processing elements PPE0–PPE7 through the crossbar network 306.

In FIG. 3A, 32 pixels indexed as 00, 01, 02, . . . 31 are loaded into the memory modules 302a–p, respectively, where the initial 16 consecutive pixels are distributed in adjacent columns along the first or bottom row of the memory modules 302a–p, and the next 16 consecutive pixels are distributed on the second row, and so on. The address generators 304a–p determine the desired row of the memory modules 302a–p to access the respective pixels, and the crossbar network 306 directs the selected pixel in selected columns to the proper processing element PPE0–PPE7. Horizontal decimation is performed using a "three tap" filter with coefficients k1, k2 and k3, which are loaded into the HREG 208 and provided to the processing array 212 at the appropriate time. Three consecutive pixels, $p_i$, $p_{i+1}$ and $p_{i+2}$, are provided to each of the processing elements PPE0–PPE7, one at a time, where each processing element performs the following equation (1):

$$k1 \times p_i + k2 \times p_{i+1} + k3 \times p_{i+2} = q_j \quad (1)$$

where the symbol "x" denotes multiplication, and where $q_j$ denotes the corresponding output pixel value. For purposes of horizontal decimation, the next adjacent processing element receives pixels $p_{i+2}$, $p_{i+3}$, $p_{i+4}$ for calculating $q_{j+1}$, and so on. It is noted that calculations involving pixels $p_{i+1}$, $p_{i+2}$, $p_{i+3}$ or $p_{i+3}$, $p_{i+4}$, $p_{i+5}$ and so on are not performed for purposes of decimation. Thus, a certain number of input pixels are decimated to half the number of output pixels.

FIGS. 3B–3D are a series of snapshot diagrams illustrating the use of the pixel register 300 of FIG. 3A to provide data to the processing elements PPE0–PPE7 during horizontal decimation. As illustrated in FIG. 3B, the first eight even pixels indexed at 00, 02, 04 . . . 14, corresponding to pixels p0, p2, p4, . . . p14, are retrieved and provided to the processing elements PPE0–PPE7, respectively, during a first cycle. Then, as illustrated in FIG. 3C, a consecutive group of adjacent odd pixels 01, 03, 05 . . . 15, corresponding to pixels p1, p3, p5, . . . p15, are retrieved and provided to the processing elements PPE0–PPE7, respectively, during a second cycle. Finally, as illustrated in FIG. 3D, the next consecutive group of adjacent even pixels 02, 04, 06 . . . 16, corresponding to pixels p2, p4, p6 . . . p16, are retrieved and provided to the processing elements PPE0–PPE7, respectively, during a third cycle. Thus, processing element PPE0 receives pixels p0, p1, p2 for calculating an output pixel $q_0$, processing element PPE1 receives pixels p2, p3, p4 for calculating an output pixel $q_1$, and so on, where the respective processing elements perform horizontal decimation according to equation (1). This process is repeated for all pixels of each picture until all pictures are processed.

The traditional design suffers from the high cost, size and power consumption of the crossbar network 306. Furthermore, an excessive number of memory modules and corresponding address generators are required to supply the proper pixel values to the processing elements PPE0–PPE7. Each of the memory modules 302a–p requires a significant amount of hardware overhead including the address generators 304a–p and associated power grids, routing, etc. The address decoding is non-trivial for particular functions including horizontal decimation, in which particular consecutive pixels must be supplied at the appropriate time.

Figure 4:
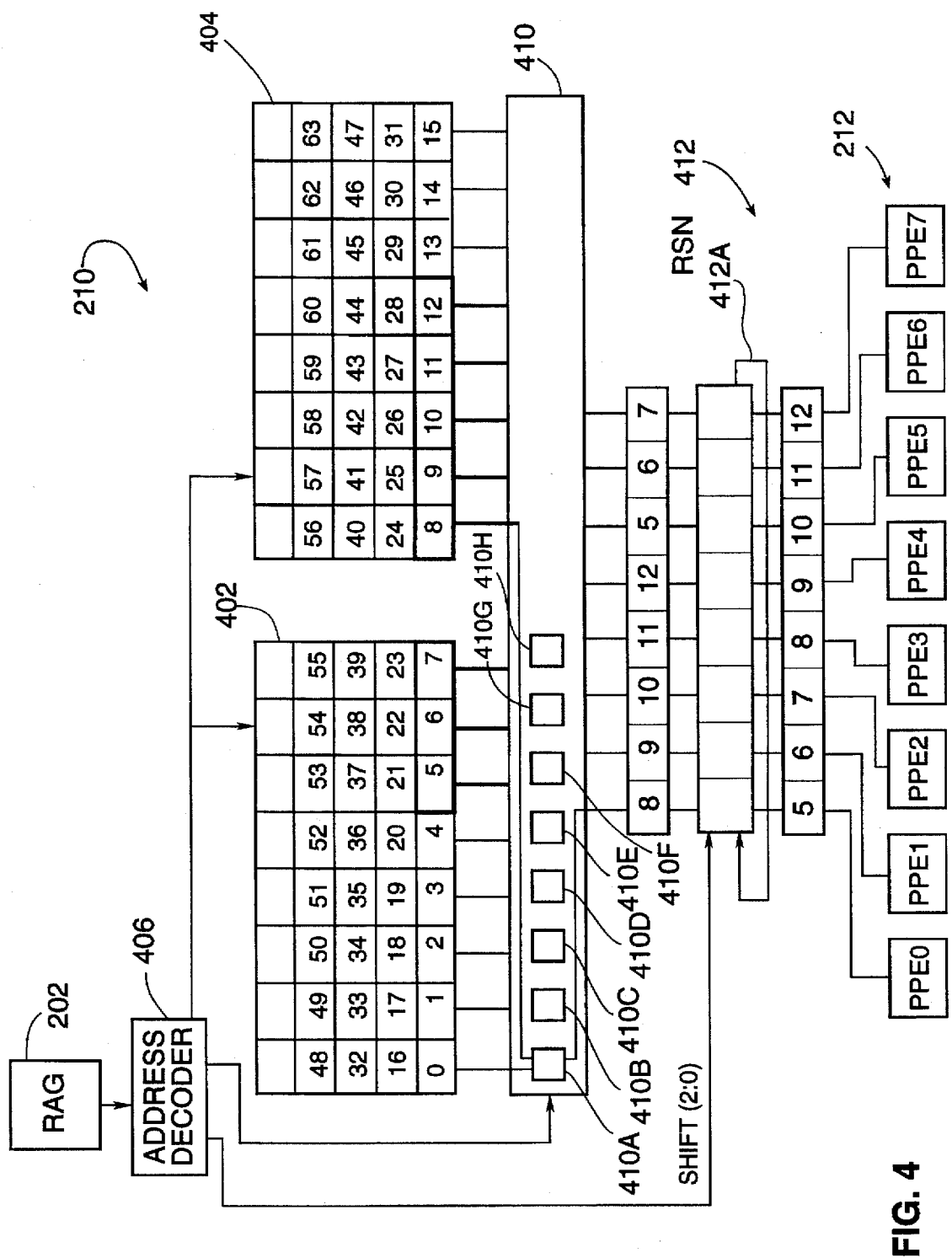
FIG. 4 is a simplified block diagram of the pixel register of FIG. 2 implemented according to the present invention.

Referring now to FIG. 4, a simplified block diagram is illustrated of the pixel register 210 of FIG. 2 implemented according to the present invention and coupled to the processing elements PPE0–PPE7 of the processing array 212. The primary memory buffer preferably includes two eight by j-bit wide memory modules 402, 404 for storing the pixel values. As compared to the configuration of FIG. 3A, the memory modules 402, 404 together have the same width and number of columns as the combined width of the modules 302a–p. Each row of the memory buffer includes a corresponding row of each of the modules 402, 404. The pixel values are indexed at 0, 1, 2 . . . 15 in a first row, as 16, 17, 18 . . . 31 in a second row and so on.

The pixel values in the memory modules 402, 404 are accessed by two address values, respectively, asserted by an address decoder 406. The address decoder 406 receives an address from the RAG 202, and provides the corresponding address values to the memory modules 402, 404. It is noted that two separate address decoders might normally be required to assert two address values to the modules 402, 404. However, the present invention allows a simpler implementation where the second address value provided to the odd memory module 404 is simply a conditional increment of the first address value provided to the even module 402. In particular, a value of 1 is added to the first address if the first of the eight addressed pixels lies in the odd memory module 404. Otherwise, the address values to both memory modules 402, 404 are the same. In this manner, separate address generators are not needed and a relatively simple address decoder 406 is sufficient.

The memory modules 402 and 404 are coupled to an 8×2:1 multiplexer (mux) array 410, which preferably includes eight 2:1 8-bit muxes 410a–h. Each of the muxes 410a–h of the array 410 includes two data inputs, where each input is coupled to respective columns of the even and odd memory modules 402 and 404. In particular, the mux 410a has one input for receiving a pixel value from the column at index 0 of the even memory module 402, which is the first column of the module 402. The other input of the mux 410a receives a pixel value from the column at index 8 of the odd memory module 404, which is the first column of the module 404. Thus, the mux 410a selects between the first columns of the modules 402, 404. In a similar manner, the muxes 410b–h each have their respective inputs connected to receive pixel values at indexes 1 and 9, 2 and 10, 3 and 11, etc. for the 2nd, 3rd, 4th, etc. columns of the even and odd modules 402 and 404, respectively, for selecting between respective columns of the memory modules 402, 404.

The address decoder 406 also asserts an 8-bit select value or code to the mux array 410, where one bit is provided to respective ones of the muxes 410a–h. A select bit equal to zero selects a column of the even memory module 402 while a select bit equal to one selects a column of the odd memory module 404. In the example of FIG. 4, pixel values at indexes 5–12 are highlighted to be selected. The muxes 410a–e receive select bits equal to one to select the pixels 8–12 and the muxes 410f–h receive select bits equal to zero to select the pixels 5–7, respectively. It is noted that due to this configuration, the pixels are selected by the mux array 410 in a predetermined order depending upon the particular pixels selected. This ordering, however, is not necessarily the order intended by the address asserted by the RAG 202.

The eight-bit outputs of the muxes 410a–h are provided to the inputs of respective locations of a right shift network (RSN) 412, where the outputs of such corresponding locations are further connected to the processing elements PPE0–PPE7. In this manner, the address decoder 406 asserts address values to select the desired rows of the even and odd memory modules 402 and 404 containing the pixel values. The address decoder 406 also asserts the select code to the muxes 410a–h for selecting a desired column of either the even memory module 402 or the odd memory module 404 for determining specific pixel values to be loaded into the RSN 412.

The RSN 412 is illustrated including a feedback path 412a for connecting the least significant bit (LSB) to the most significant bit (MSB) to enable right shifting of the pixel values stored in the RSN 412. The address decoder 406 asserts a shift value to the RSN 412 indicating the desired number of pixel shifts. In the preferred embodiment, the shift value need only be 3 bits for selecting any number of pixel shifts between 0 and 7, inclusive, for the eight pixel values.

There are several benefits with the pixel register 210 illustrated in FIG. 4 as implemented according to the present invention. First, only two memory modules 402 and 404 are provided, rather than the sixteen separate modules required in FIG. 3A. The associated overhead is simplified since the second address to the odd memory module 404 is simply a conditional increment of the first address, so that only one address decoder need be provided. Once the correct pixels are loaded into the RSN 412, they are simply right-shifted the appropriate number of times to place them in the correct order for loading into the processing array 212. Very simple logic is needed within the address decoder 406 for determining the correct pixels and the desired number of shifts required. For vertical and temporal accesses, both designs read the buffers in eight by j-bit boundaries. To access data two-dimensionally, the access pattern is broken down into horizontal direction and then vertical direction. In this manner, the pixel register 210 illustrated in FIG. 4 performs all the functions of the pixel register 300 illustrated in FIG. 3A.

The RSN 412 including the feedback path 412a is illustrated for purposes of illustration but would not provide the fastest operation. Actually right shifting bits through the RSN 412 in this manner is relatively slow and such an implementation may take too much time depending upon the desired data throughput. The RSN 412, therefore, may be implemented in more efficient ways, such as using multi-stage muxes or even a single stage of 8×8:1 muxes to achieve the desired rearrangement of the pixels. The particular implementation is a matter of design choice based on cost and speed considerations. Several exemplary implementations will now be described, although other particular implementations are certainly possible. It is also noted that a left shift network could equally be used, as well as any type of re-ordering network known to those skilled in the art.

Referring now to FIG. 5, a more detailed diagram is illustrated of one implementation of the RSN 412 of FIG. 4 using three stages (or rows) of muxes. The outputs of the muxes 410a–h are illustrated as index values 0–7, respectively. A first stage of 8×2:1, 8-bit muxes 502a–h each have one data input coupled to the corresponding output of the muxes 410a–h, respectively, and its other data input receiving the output of an adjacent mux of the muxes 410a–h. In particular, the mux 502a receives the output of the mux 410h, and the other data input of the muxes 502b–h receives the output of the muxes 410a–g, respectively. A select bit of zero provided to all of the muxes 502a–h would allow pass through without any shifting, whereas a select bit of one would enable a right shift of one pixel.

Another stage of 8×2:1, 8-bit muxes 504a–h are provided, each having one data input connected to the outputs of the muxes 502a–h, respectively, and its other data input coupled to the next adjacent mux to perform a double shift. In particular, the other inputs of the muxes 504a, b receive the outputs of muxes 502j,h, respectively, and the other data inputs of each of the muxes 504c–h receive the outputs of muxes 502a–f, respectively. A select bit of zero provided to the select input of all the muxes 504a–h allows pass through without shifting pixels, whereas a select bit of one enables a shift of two pixels.

A third stage of 8×2:1, 8-bit muxes 506a–h are provided to perform a quadruple shift. In particular, the muxes 506a–d each have one data input connected to the respective outputs of the muxes 504a–d, and the other data input connected to the respective outputs of the muxes 504e–h. The muxes 506e–h each have one data input connected to the respective outputs of the muxes 504e–h, and the other data input connected to the respective outputs of the muxes 504a–d. Again, a select bit of zero provided to all of the muxes 506a–h allows pass through with no shift whereas a select bit of one enables a shift of four pixels. The three stages together form a 3×8×2:1 mux network.

The RSN 412 receives a 3-bit binary shift value from the address decoder 406 indicating the number of right shifts desired. In particular, one bit of the right shift address value is provided to the select inputs of the muxes 502a–h, another bit is provided to the select inputs of the muxes 504a–h and the last bit is provided to the select inputs of the muxes 506a–h. For example, a shift value of 001b (binary 1), where "b" denotes a binary value indicates a shift of one pixel value, where the muxes 502a–h receive the LSB bit of one to shift the pixels right by one pixel value, whereas the muxes 504a–h and 506a–h receive select bits zero and simply pass the pixel values without any shift. Likewise, a shift value of 101b (binary 5) causes the muxes 502a–h to shift by one, the muxes 504a–h to pass values with no shift and the muxes 506a–h to shift four pixel values to the right, for a total of five pixel shifts to the right.

Figure 5A:
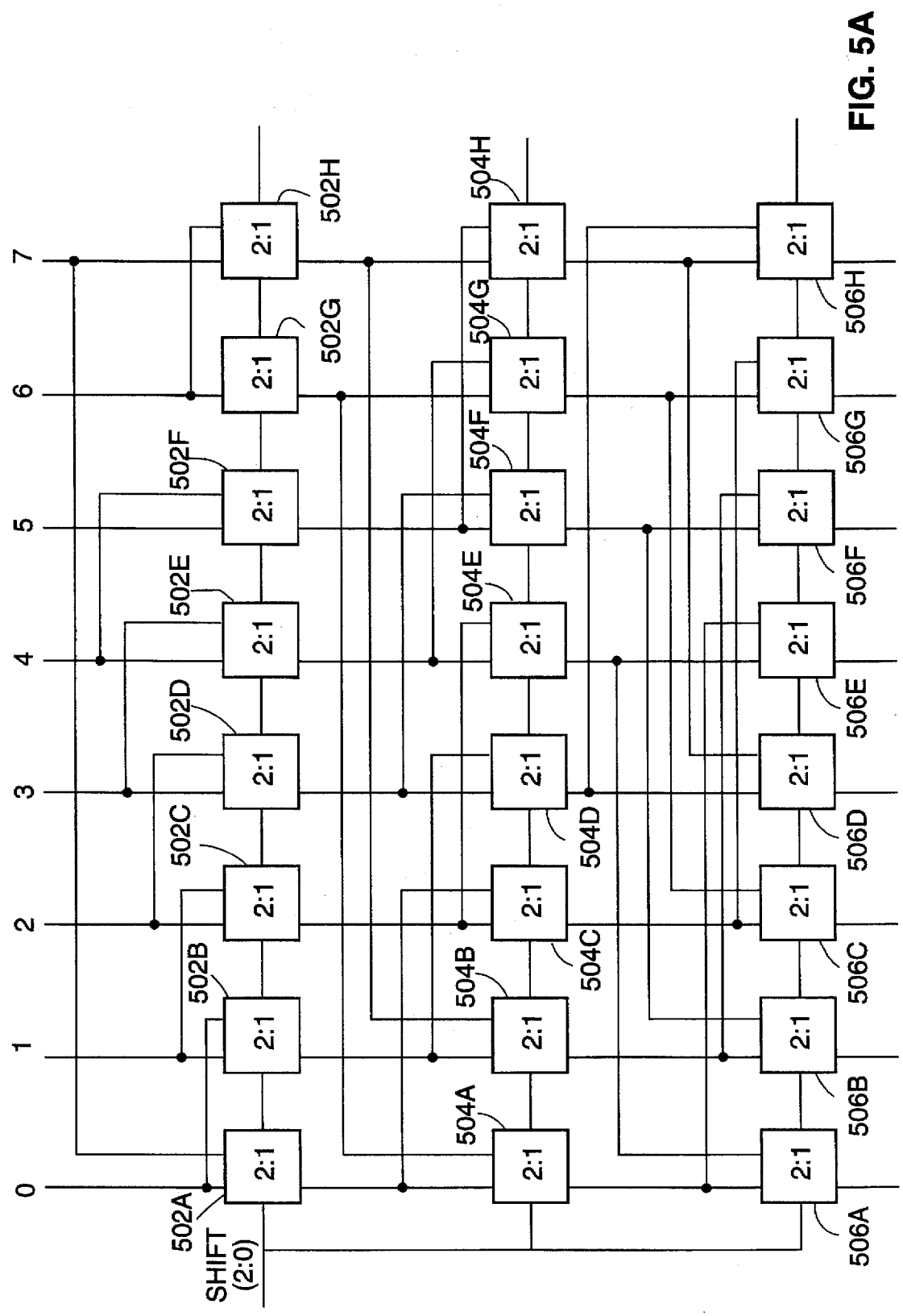
FIGS. 5A and 5B are schematic diagrams of exemplary and alternative implementations of the right shift network of FIG. 4.

The three-stage mux RSN illustrated in FIG. 5A is significantly faster than a bit-by-bit implementation, although it is slightly more complex. Nonetheless, the use of the 3-stage RSN combined with the single stage mux array 410 is much less costly and less power consuming than the crossbar network 306 of FIG. 3.

Figure 5B:
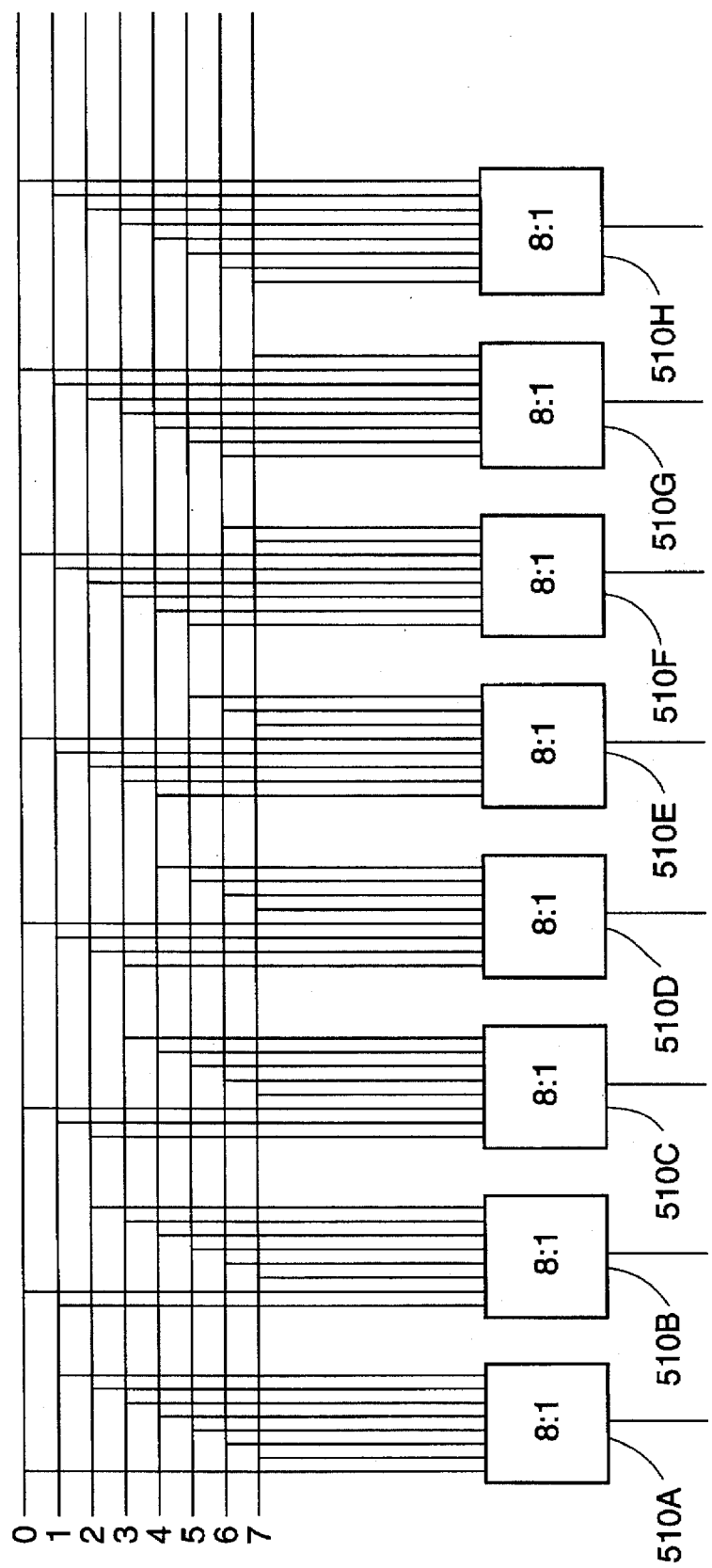

FIG. 5B illustrates an alternative embodiment of the RSN 412 including 8×8:1, 8-bit muxes 510a–h. Each of the muxes 510a–h receive the 3-bit right shift address to perform the desired number of pixel value right shifts. In particular, the bit-zero data input of each of the muxes 510a–h receive the outputs of the muxes 410a–h, respectively, in the event no right shift is desired. The bit-one data input of each of the muxes 510a–h receive the outputs of the muxes 410h, 410a–g, respectively, for a single right shift and so on. The use of the 8×8:1 muxes 510a–h is slightly more expensive than the three-stage embodiment of FIG. 5A. However, the embodiment illustrated in FIG. 5B using the muxes 510a–h is faster than the three-stage embodiment since only a single stage of delay is encountered. The routing required for the 8×8:1 mux network is slightly more complicated than for the 3×8×2:1 mux network of FIG. 5A.

Figure 6:
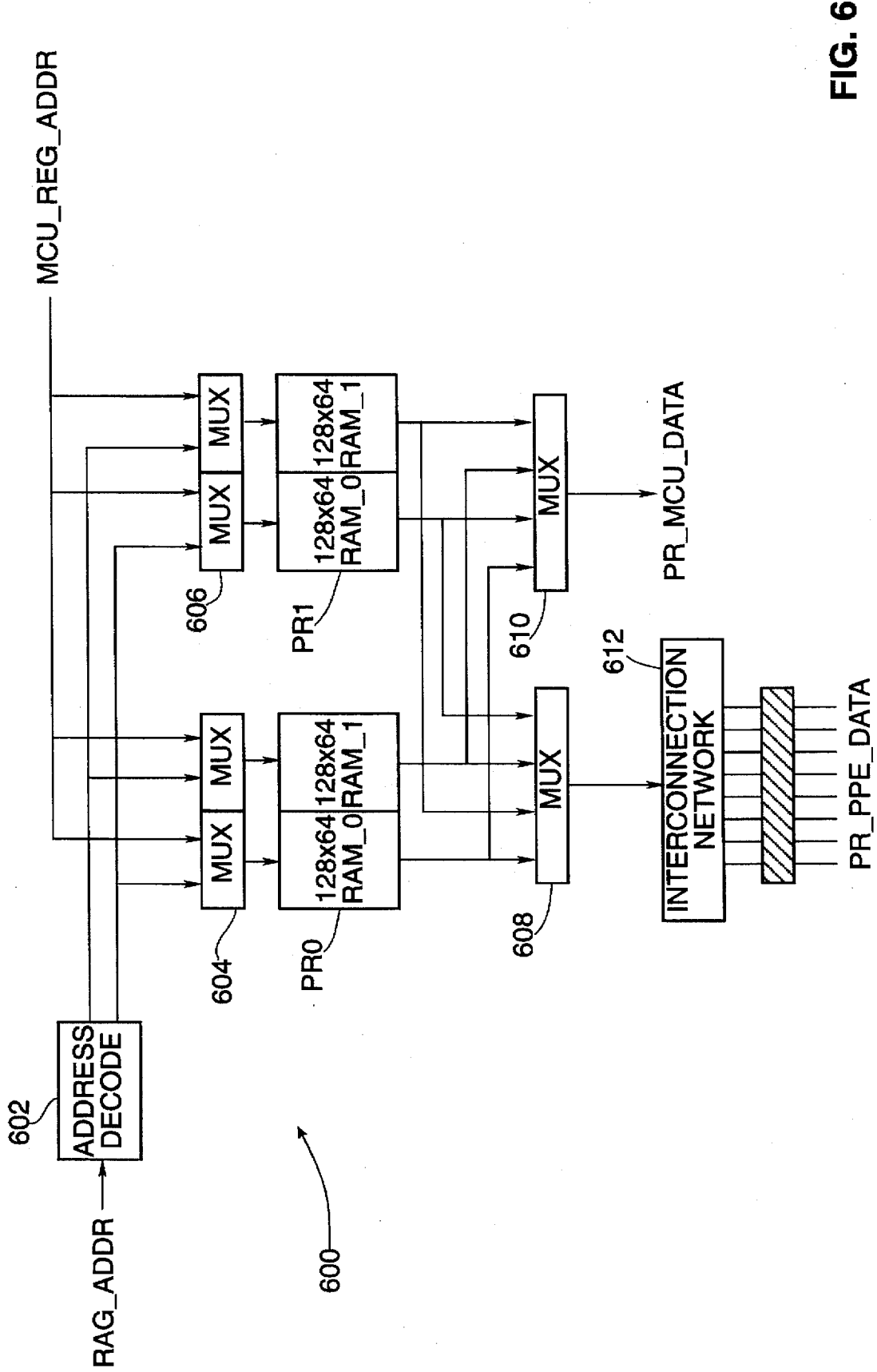
FIG. 6 is a more detailed block diagram of the read path circuitry of the pixel register of FIG. 4.

Referring now to FIG. 6, a more detailed block diagram is illustrated of one embodiment the pixel register 210 illustrating the read data path. In the preferred embodiment, there are two primary registers PR0 and PR1, where each register includes two banks of 128 by 64-bit, two port, 8-bit byte writeable RAM, referred to as RAM_0 and RAM_1, respectively. Bank RAM_0 is the even bank and bank RAM_1 is the odd bank for each of the registers PR0 and PR1. An address from the RAG 202 is provided to an address decoder 602, which provides addresses to the select inputs of a series of input muxes 604 and 606, which provide their outputs to the pixel registers PR0 and PR1, respectively. Addresses are provided from a register of the MCU 108 to the input of the muxes 604 and 606 for providing addresses to the pixel registers PR0 and PR1, respectively. The address decoder 602 also provides select signals to another set of muxes 608 and 610 for selecting data from the pixel registers PR0 and PR1 for providing data either to the processing array 212 through an interconnection network 612, or back to the MCU 108 through the mux 610. In this manner, the PPE 212 could operate on one register while the MCU 108 could load or store the other register.

Figure 7:
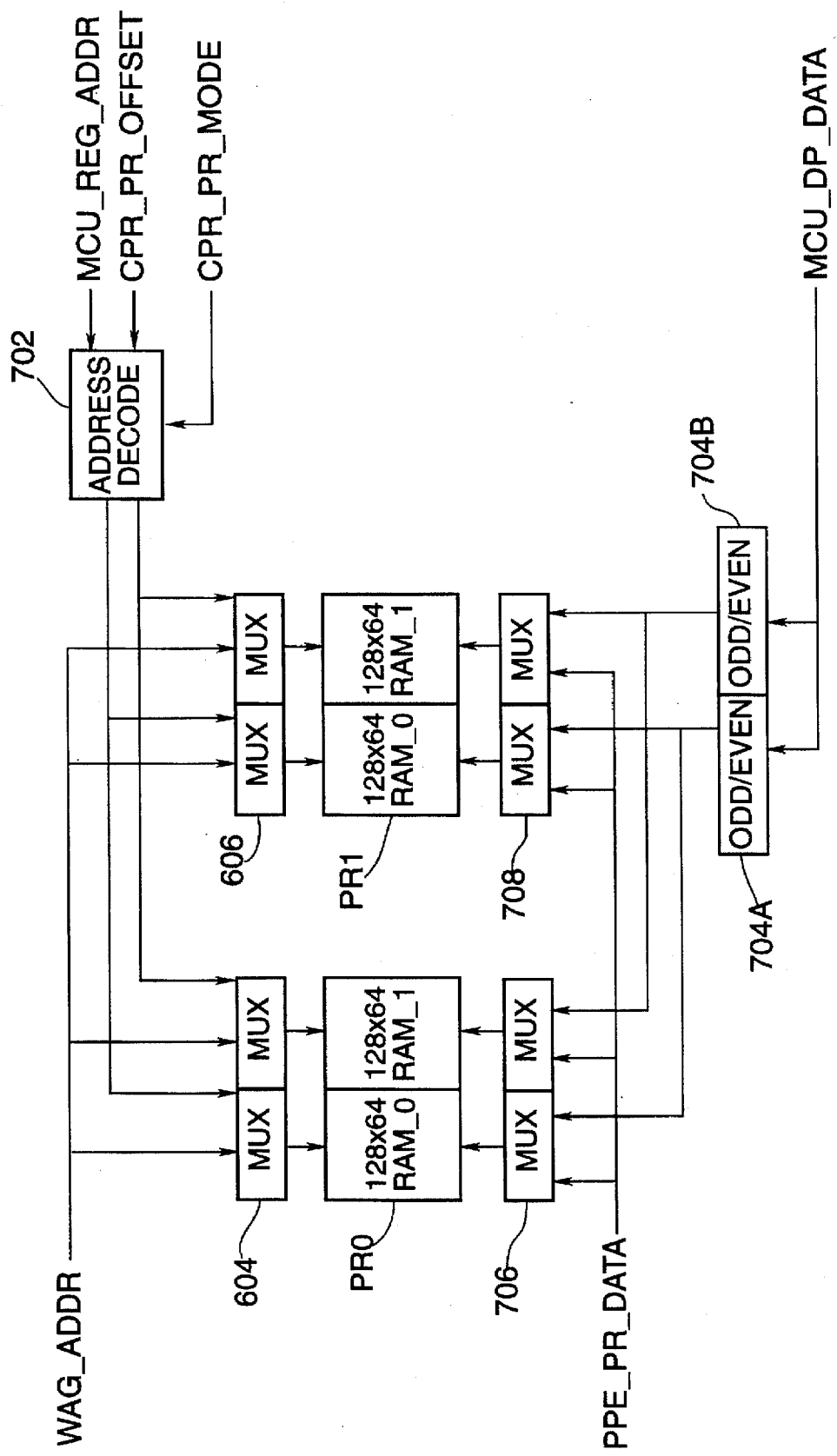
FIG. 7 is a more detailed block diagram of the write path circuitry of the pixel register of FIG. 4.

FIG. 7 illustrates the write circuitry of the pixel register 210. An address from the WAG 204 is provided to the select inputs of the input muxes 604, 606 and an address and offset from the MCU 108 is provided to an address decoder 702. This provides addressing to the pixel registers PR0 and PR1. Data from the MCU 108 is provided by two odd/even pixel assemblers 704a and 704b for providing data to the pixel registers PR0 and PR1, respectively, where the outputs of the pixel assembler 704a and 704b are provided to input muxes 706 and 708 corresponding to the pixel registers PR0 and PR1. The input muxes 706 and 708 select data between the MCU 108 of the processing array 212.

In particular, each 64-bit word written by the MCU 108 is separated into two groups of pixels by the pixel assemblers 704a and 704b. One of the groups is the four even pixels and the other group is the remaining four odd pixels. The two groups are then written into the two 128 by 64-bit RAMs (RAM__0, RAM__1) separately. The addresses are generated by adding an offset to the address from the MCU 108. The even address is used to address the bank RAM__0, while the odd address is used to address the bank RAM__1. Four corresponding 8-bit write enable signals are set for each of the RAM banks.

FIGS. 6 and 7 illustrate a more general embodiment, where an array of muxes and a shift network are provided for both pixel registers PR0 and PR1 to address the correct pixels and place them into the correct ordering. An embodiment including two separate pixel registers PR0 and PR1 emphasizes sharing of the pixel registers between the PPE 212 and the MCU 108 so that they could operate concurrently.

Figure 8A:
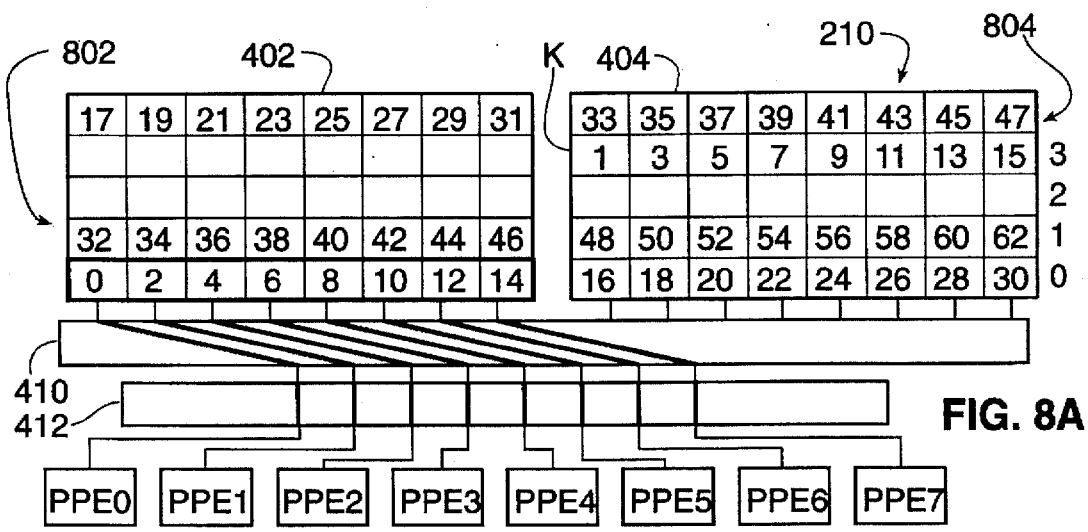
FIGS. 8A–8C are a series of snapshot diagrams illustrating a horizontal decimation operation using the pixel register of FIG. 4.
Figure 8B:
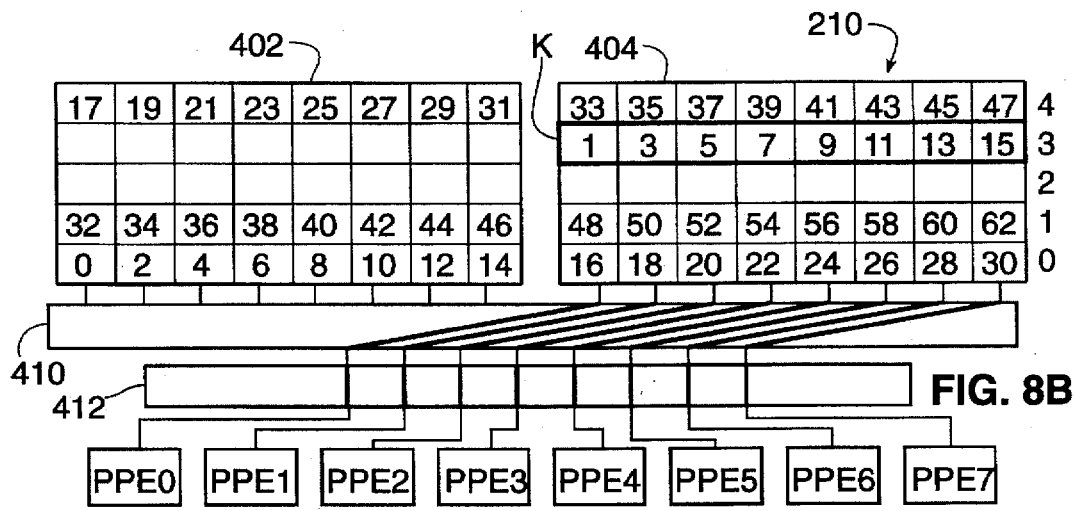
Figure 8C:
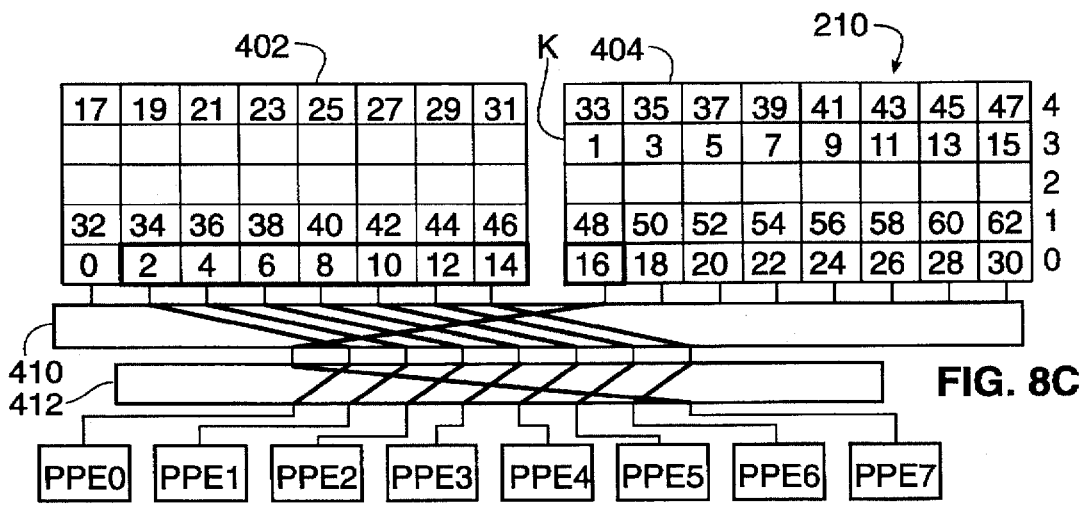

FIGS. 8A–8C are a series of snapshot diagrams illustrating a horizontal decimation operation using the pixel register 210 of FIG. 4. For purposes of horizontal decimation, the pixel values are separated into even and odd groups and stored in separate regions in the memory modules 402, 404. In particular, the even pixels 00, 02, 04, ... 62, otherwise referred to as even pixels p0, p2, p4, ... p62, are stored in consecutive locations in an even region 802 beginning at an initial index of zero starting in the module 402. The odd pixels 01, 03, 05, ... 63, otherwise referred to as odd pixels p1, p3, p, ... p63, are stored in consecutive locations in an odd region 804 beginning at an offset address K from the initial index of zero. This data organization or configuration enables maximum processor utilization of the processing array 212. Each of the processing elements PPE0–PPE7 are fed pixels during each cycle and thus remain active rather than having idle periods.

The offset K is preferably an address number which places the odd pixel region 804 beyond the even pixel region 802 and also so that the odd pixel region 804 begins in the module 404. The actual numeric value of K depends upon the size of the even and odd blocks as well as its unit value. For example, if K has units representing a group of 8 pixel values, then K is preferably an odd number of at least 5 so that p1 is located in the first column of the memory module 404 at a row beyond the even pixel region 802. In FIG. 8A, for the 64 pixels including an even group p0–p62 and an odd group p1–p63, K=7. If K has units representing individual pixel values, then K is 56. Although FIG. 8A illustrates a combined group of 64 pixels, it is understood that any number of pixels may be separated into even and odd groups and stored into two separate regions, as illustrated, where the primary limitation is the size of the modules 402, 404.

Once the even and odd groups of pixels are stored in the modules 402, 404 in a manner as illustrated in FIG. 8A, a horizontal decimation operation is performed. In a first step as illustrated in FIG. 8A, a first group of eight even pixels p0, p2, p4 ... p14 in the first row of the module 402 are provided to the processing elements PPE0–PPE7, respectively. In the next step as illustrated in FIG. 8B, a second group of eight adjacent odd pixels p1, p3, p5 ... p15 from the module 404 are provided to the processing elements PPE0–PPE7, respectively. In a final step as illustrated in FIG. 8C, a third group of the next eight even pixels p2, p4, p6 ... p16 in the first row of the module 402 are provided to the processing elements PPE0–PPE7, respectively. In this manner, the pixels p0, p1, p2 are provided to the processing element PPE0, the pixels p2, p3, p4 are provided to the processing element PPE1, and so on, so that the processing elements PPE0–PPE7 perform the horizontal decimation according to equation (1) as described previously. In a similar manner as described previously, the coefficient values k1, k2 and k3 are provided during the respective three cycles from the HREG 208 to the processing elements PPE0–PPE7.

Although three separate steps to access the pixels are performed, the address decoding is substantially simplified as compared to FIGS. 3B–3D. The address decoder 406 asserts an address value indicating row zero (0) to the memory module 402 in FIGS. 8A and 8C to access the desired pixels. In FIG. 8B, the address decoder 406 asserts an address value indicating row three (3) to the memory module 404 to access the odd pixels and asserts an address value indicating row zero (0) to the memory module 404 in FIG. 8C to access pixel p16. The address decoder 406 asserts a select value of 00h (where "h" denotes hexadecimal notation) to the muxes 410 in FIG. 8A to indicate all of the columns of the address module 402. The address decoder 406 asserts a select value of 11h to the muxes 410 in FIG. 8B to indicate all of the columns of the address module 404. The address decoder 406 asserts a select value of 10h in FIG. 8C to indicate the first column of the memory module 404 and the second through eighth column of the memory module 402. A shift value of 000b is provided to the RSN 412 in all steps since shifting is not necessary. In the final cycle, a shift value of 111h is provided to the RSN 410 to properly align the pixels for the processing elements PPE0–PPE7.

It is now appreciated that a method and apparatus for improved video operations using efficient pixel register and improved data organization according to the present invention provides the functionality of a crossbar network without its prohibitive cost, size and power consumption. Also, overhead associated with address generators for multiple memory modules is substantially reduced. First and second (or odd and even) n-wide memory modules hold digital data for an array of n processing elements. An address decoder receives an address and asserts corresponding address values and a select value to access n pixels from the memory modules for selection by an array of muxes. The array of muxes selects between respective columns of the memory modules and thus retrieves the pixels according to a predetermined order. The pixels are separated into even and odd pixels and stored in the memory buffer in two separate regions separated by an offset address. This facilitates access of the pixels more readily using a pixel register according to the present invention.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

I claim:

1. A data register for providing data to an n-element parallel processing array for performing filtering operations, comprising:

a memory buffer including first and second memory modules, each including n columns of data locations, wherein a plurality of consecutive data values are stored in said memory buffer in two separate groups, including a group of even data values stored in a first region of said memory buffer beginning in said first memory module, and a group of odd data values stored in a second region beginning in said second memory module and separated from the beginning of said first region by an offset address value;

select logic coupled to said first and second memory modules for selecting between respective columns of said first and second memory modules and for retrieving n selected data values according to a predetermined order;

a shift network coupled to said select logic for reordering said retrieved data values from said select logic and for providing said reordered data values to the processing array; and address decoder logic coupled to said memory buffer, said select logic and said shift network and receiving an address for asserting corresponding address values to said first and second memory modules, respectively, for providing a select value to said select logic and for providing a shift value to said shift network to retrieve n data values at a time from said group of even data values and said group of odd data values and for providing said retrieved data values to the processing array.

2. The data register of claim 1, wherein a filtering operation is horizontal decimation.

3. The data register of claim 2, wherein said address decoder logic asserts values to retrieve a first set of n data values from said group of even data values in a first cycle, asserts values to retrieve a second set of n adjacent data values from said group of odd data values in a second cycle, and asserts values to retrieve a third set of the next adjacent n data values from said group of even data values in a third cycle.

4. The data register of claim 3, further comprising:

a coefficient register for coupling to the processing array for providing coefficient values to said processing array during said first, second and third cycles.

5. The data register of claim 4, wherein said coefficient values include a first coefficient for multiplying each data value of said first set of data values during said first cycle, a second coefficient for multiplying each data value of said second set of data values during said second cycle, and a third coefficient for multiplying each data value of said third set of data values during said third cycle.

6. The data register of claim 1, wherein said data values are pixels.

7. The data register of claim 1, wherein n is equal to eight.

8. The data register of claim 1, wherein said select logic comprises an array of multiplexers.

9. The data register of claim 1, wherein said shift network comprises a plurality of stages of 2:1 multiplexers, wherein each stage includes at least n multiplexers.

10. The data register of claim 1, wherein said shift network comprises an array of n×n:1 multiplexers.

11. A pixel register for a programmable video filter, the video filter including read and write address generators, a microcontroller and an array of processing elements, said pixel register comprising:

a memory buffer for storing pixel values for filtering by the array of processing elements, said memory buffer comprising first and second memory banks each having a width corresponding to the number of processing elements, wherein a plurality of consecutive pixel values are stored in two separate groups, including a first group of even pixel values stored in a first region of said memory buffer beginning in said first memory bank, and a second group of odd pixel values stored in a second region beginning in said second memory bank and separated from the beginning of said first region by an offset address value;

select logic coupled to said memory buffer for selecting between respective columns of said first and second memory banks for retrieving pixel values according to a predetermined order;

a shift network coupled to said select logic for reordering said accessed pixel values based on said address and for providing said reordered pixel values to the array of processing elements; and address decoder logic for decoding an address from an address generator for providing address values to said memory buffer, for providing a select value to said select logic and for providing a shift value to said shift network to retrieve pixel values from said first and second groups of pixel values.

12. The pixel register of claim 11, wherein the video filter performs decimation operations.

13. The pixel register of claim 12, wherein said address decoder logic asserts values to retrieve a first set of pixel values from said first group of even pixel values in a first cycle, asserts values to retrieve a second set of adjacent pixel values from said second group of odd pixel values in a second cycle, and asserts values to retrieve a third set of the next adjacent pixel values from said first group of even pixel values in a third cycle.

14. The pixel register of claim 13, further comprising:

a coefficient register for coupling to the processing array for providing coefficient values to said processing array during said first, second and third cycles.

15. The pixel register of claim 14, wherein said coefficient values include a first coefficient for multiplying each pixel value of said first set of pixel values during said first cycle, a second coefficient for multiplying each pixel value of said second set of pixel values during said second cycle, and a third coefficient for multiplying each pixel value of said third set of pixel values during said third cycle.

16. The pixel register of claim 11, wherein said select logic comprises an array of multiplexers.

17. The pixel register of claim 11, wherein said shift network comprises a plurality of stages of 2:1 multiplexers.

18. The data register of claim 11, wherein for a processing array of n elements, said shift network comprises an array of n×n:1 multiplexers.

19. A method for performing horizontal decimation on a plurality of consecutive pixel values by an n-element processing array, comprising the steps of:

separating a plurality of pixel values into even and odd pixel values;

storing said even and odd pixel values into two separate regions of two contiguous memory banks, including an even region for storing even pixel values beginning in one of the memory banks and an odd region for storing odd pixel values beginning in the other memory bank, each bank including n columns and a plurality of rows of data locations;

retrieving a first set of even pixel values from the even region and providing the first set of pixel values to the processing array;

retrieving a second set of associated odd pixel values from the odd region and providing the second set of pixel values to the processing array; and retrieving a third set of the next associated even pixel values from the even region and providing the third set of pixel values to the processing array.

20. The method of claim 19, further comprising the steps of:

in a first computation step, multiplying each pixel value of the first set of pixels values by a first coefficient and storing the first result;

in a second computation step, multiplying each pixel value of the second set of pixels values by a second coefficient and adding the result to the results of said first computation step; and in a third computation step, multiplying each pixel value of the third set of pixels values by a third coefficient and adding the result to the results of said second computation.

* * * * *